US009038958B1

(12) United States Patent
Ross et al.

(10) Patent No.: US 9,038,958 B1
(45) Date of Patent: May 26, 2015

(54) METHOD AND APPARATUS FOR CONTINGENCY GUIDANCE OF A CMG-ACTUATED SPACECRAFT

(71) Applicants: Isaac Michael Ross, Monterey, CA (US); Donghun Lee, Monterey, CA (US); Mark Karpenko, Marina, CA (US)

(72) Inventors: Isaac Michael Ross, Monterey, CA (US); Donghun Lee, Monterey, CA (US); Mark Karpenko, Marina, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 117 days.

(21) Appl. No.: 13/901,444

(22) Filed: May 23, 2013

Related U.S. Application Data

(60) Provisional application No. 61/652,774, filed on May 29, 2012.

(51) Int. Cl.
*B64G 1/28* (2006.01)
(52) U.S. Cl.
CPC ...................................... *B64G 1/286* (2013.01)
(58) Field of Classification Search
USPC .................................... 244/165, 164; 701/13
See application file for complete search history.

(56) References Cited

U.S. PATENT DOCUMENTS

| | | | |
|---|---|---|---|
| 6,039,290 A | 3/2000 | Wie et al. | |
| 6,047,929 A * | 4/2000 | Kaji et al. | 248/58 |
| 6,131,056 A * | 10/2000 | Bailey et al. | 701/13 |
| 6,154,691 A * | 11/2000 | Bailey | 701/13 |
| 6,917,862 B2 * | 7/2005 | Wie | 701/13 |
| 7,014,150 B2 * | 3/2006 | Peck et al. | 244/165 |
| 7,627,404 B2 * | 12/2009 | Heiberg | 701/13 |
| 7,904,214 B2 | 3/2011 | Heiberg | |
| 2006/0022091 A1 | 2/2006 | Peck et al. | |
| 2007/0102585 A1 * | 5/2007 | Johnson et al. | 244/165 |
| 2009/0039202 A1 * | 2/2009 | Ogo et al. | 244/165 |

FOREIGN PATENT DOCUMENTS

| | | | |
|---|---|---|---|
| EP | 1749743 A1 * | 2/2007 | |
| EP | 1908686 A1 * | 4/2008 | |

OTHER PUBLICATIONS

Journal of Guidance, Control, and Dynamics Singularity Analysis of Variable-Speed Control Moment Gyros Hyungjoo Yoon and Panagiotis Tsiotras vol. 27, No. 3, May-Jun. 2004.*
Kurokawa, H., "Survey of Theory and Steering Laws of Single-Gimbal Control Moment Gyros," Journal of Guidance, Control, and Dynamics, vol. 30, No. 5, 2007, pp. 1331-1340.
Paradiso, J., "Global Steering of Single Gimballed Control Moment Gyroscopes Using a Directed Search," Journal of Guidance, Control, and Dynamics, vol. 15, No. 5, 1992, pp. 1236-1244.

(Continued)

*Primary Examiner* — Christopher P Ellis
(74) *Attorney, Agent, or Firm* — Naval Postgraduate School; Lisa A. Norris

(57) ABSTRACT

Methods and apparatus are presented for spacecraft operation using non-Eigen axis attitude transitions via control momentum gyroscopes (CMGs) to avoid or mitigate singularities by providing a time-varying attitude command vector including a plurality of time-varying attitude command signals or values representing a plurality of spacecraft states and control trajectories as a guidance command input to an attitude controller of the spacecraft without modifying the spacecraft feedback control law.

20 Claims, 5 Drawing Sheets

(56) References Cited

OTHER PUBLICATIONS

Bedrossian, N.S. et al., "Redundant Single Gimbal Control Moment Gyroscope Singularity Analysis," Journal of Guidance, Control, and Dynamics, vol. 13, No. 6, 1990, pp. 1096-1101.

Leve, F.A. et al., "Hybrid Steering Logic for Single-Gimbal Control Momentum Gyroscopes," Journal of Guidance, Control, and Dynamics, vol. 33, No. 4, 2010, pp. 1201-1212.

Wie, B. et al., "Singularity Robust Steering Logic for Redundant Single-Gimbal Control Moment Gyros," Journal of Guidance, Control, and Dynamics, vol. 24, No. 5, 2001, pp. 865-872.

Ford, K.A. et al., "Singularity Direction Avoidance Steering for Control-Moment Gyros," Journal of Guidance, Control, and Dynamics, vol. 23, No. 4, 2000, pp. 648-656.

Fahroo, F. et al., "Costate Estimation by a Legendre Pseudospectral Method," Journal of Guidance, Control, and Dynamics, vol. 24, No. 2, 2001, pp. 270-277.

Ross, I.M., "A Beginner's Guide to DIDO: A MATLAB Application Package for Solving Optimal Control Problems," Elissar TR-711, Elissar Global, Carmel, CA, Nov. 2007, pp. 1-38.

\* cited by examiner

METHOD AND APPARATUS FOR CONTINGENCY GUIDANCE OF A CMG-ACTUATED SPACECRAFT

REFERENCE TO RELATED APPLICATION

This application claims priority to and the benefit of U.S. Provisional Patent Application Ser. No. 61/652,772, filed May 29, 2012, and entitled "METHOD AND APPARATUS FOR CONTINGENCY GUIDANCE OF A CMG-ACTUATED SPACECRAFT", the entirety of which is hereby incorporated by reference.

BACKGROUND

Controlling the attitude or orientation of spacecraft is useful for many forms of such craft. For instance, a telescope mounted to a satellite may be repositioned to provide an image of an object by reorienting the spacecraft itself. A typical spacecraft is equipped with a group or array of three or more control moment gyroscopes (CMGs). Most spacecraft attitude control techniques involve so-called Eigen axis rotations. Eigen axis rotations are desirable as they are intuitively simple to construct and provide the advantage of reorienting the spacecraft along the shortest circular arc between the starting and desired final attitude angles. The angular error defined by translation from a first orientation to a second orientation can be represented as rotation through a certain angle about a particular fixed axis, referred to as the Eigen axis of the rotation. Once the Eigen axis has been determined, two other axes that need not be aligned with the reference spacecraft body fixed frame, may be selected to form an orthogonal set with the Eigen axis. Since the entire rotation from the initial to the final states is performed about the Eigen axis, the other two axes will always have zero angles to be traversed. Eigen axis rotations are normally implemented as rest-to-rest maneuvers. That is, the rotation is initiated from rest and terminated when the spacecraft is again at rest in the new desired orientation. A maneuver similar to an Eigen axis rotation can be constructed when it is desired to initiate a reorientation maneuver from a non-resting state and/or when it is desired to terminate a reorientation maneuver at a non-resting state. For such non-rest maneuvers, rotations will normally be carried out as simultaneous rotations about three orthogonal axes and designed similarly to an Eigen axis maneuver according to the kinematic differential equations. Conventional spacecraft attitude control systems, however, suffer from singularity problems arising when the torque vector outputs of the CMGs are all aligned in a plane or become collinear. In this condition, the CMG array cannot produce an output torque in a direction orthogonal to the plane or the line. As a result, singularity conditions make it difficult or impossible to perform a maneuver that accurately follows the desired path.

In the past, singularities have been addressed to a certain extent by modification of the attitude control law (CMG steering law), for example, by introducing error torques into the control law, so as to drive the spacecraft slightly away from the desired path. This has the effect of preventing the CMGs from entering singular states. However, this approach requires adjustment to the control law within the closed loop of a spacecraft attitude control system. Moreover, a CMG steering law designed to operate an array of CMGs cannot generally ensure success when one or more CMGs are inoperative. Thus, while it may be possible to avoid singularities by applying appropriate error torques via a CMG steering law, the resulting spacecraft motion is undesirable from the operational point of view because the resulting maneuver profile can be very different from the specified Eigen axis path. In this regard, most spacecraft CMG systems include four or more CMGs. Where four CMGs are provided, and one fails, there is an increased chance that a maneuver cannot be completed as desired because of CMG singularity problems. Moreover, in the failure condition, the geometric structure of the internal singularities can change, thereby significantly inhibiting the possibility of using Eigen axis control logic to reposition the spacecraft. So-called "null-motion" steering techniques have been proposed for reconfiguring a CMG array without producing a net torque output, thereby allowing the CMG array to be steered in such a manner that singular states are avoided. However, the benefits of null-motion steering may become degraded where only three CMGs remain active, such as when one CMG fails, due to introduction of internal singularities that are close to the zero angular momentum state. These internal singularities severely inhibit the effectiveness of an Eigen axis attitude controller because the CMG array can become deadlocked in a singular state. Thus, a need remains for improved techniques and apparatus for controlling spacecraft orientation or attitude by which the aforementioned difficulties can be mitigated or overcome without introduction of additional control components and without adding cost or complexity to existing spacecraft attitude control systems.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

The present disclosure provides methods and apparatus for feasible rotation of a spacecraft using guidance commands to steer a CMG-equipped spacecraft away from singular states while maneuvering the spacecraft between a starting orientation and a desired final orientation. Such feasible rotations are in general non-Eigen axis rotations and are in general different from rotations developed according to the kinematic differential equations. The present disclosure thus provides a significant advance over steering law modification techniques to overcome singularity difficulties, without modification of existing spacecraft control systems or the control laws thereof. Instead, the disclosed techniques overcome the singularity problem from a guidance point of view to provide non-Eigen axis maneuvering by use of a feasible time-varying attitude command vector as a guidance command input to an attitude controller of the spacecraft, whereby the disclosed approach can be easily implemented for existing spacecraft without modifying the prior steering law or control law. In addition, the type of maneuver that can be generated using the concepts of certain implementations of the present disclosure takes into account the characteristics of the spacecraft attitude dynamics as well as any constraints affecting the performance of the spacecraft. Furthermore, the present disclosure provides solutions for contingency operation of a spacecraft where one or more CMGs are in a failed state or otherwise inoperative.

In accordance with one or more aspects of the present disclosure, a method is provided for guiding a spacecraft from an initial state to a final state using a CMG array. The method involves formulating a control problem based on initial and final spacecraft states as well as at least one constraint, solving the control problem to provide a time-varying attitude or orientation command vector including attitude command signals or values representing a plurality of spacecraft states and controlled trajectories, and providing the attitude command vector as a guidance command input to an attitude controller of the spacecraft. In certain embodiments, the control problem is formulated by construction of an objective or cost function including a spacecraft system state and a control variable vector, and the objective function may be constructed in terms of an overall maneuver time with the control problem being solved to minimize the maneuver time in certain implementations. Various constraints may be used in solving the control problem to obtain the attitude command vector, including without limitation a model of the spacecraft dynamics and one or more path constraints, and/or box constraints related to limiting spacecraft angle rates, gimbal rates, etc. In certain embodiments, a model of the spacecraft dynamics with arbitrary fidelity is used in formulating the control problem.

A spacecraft guidance system is provided in accordance with further aspects of the present disclosure, including one or more processors programmed to receive an initial spacecraft state, a desired final spacecraft state and at least one constraint. The processor is further configured to formulate and solve a control problem based on the received input data, and to provide a resulting time-varying attitude command vector as a guidance command input to an attitude controller of the spacecraft.

Computer readable mediums are also provided, including computer executable instructions for spacecraft guidance according to the described methods.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION OF THE DISCLOSURE

Figure 1:
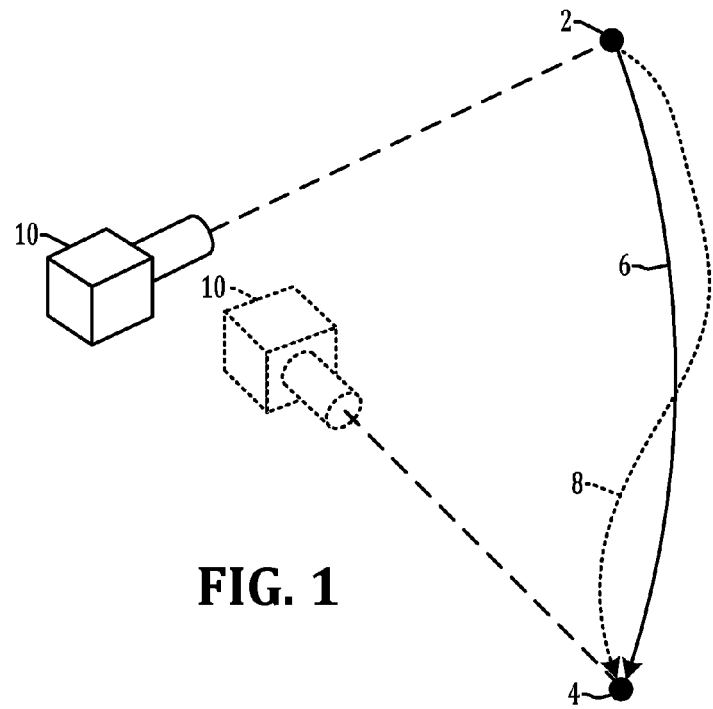
FIG. 1 is a perspective view illustrating translation of a satellite or other spacecraft from an initial orientation to a final orientation along an Eigen axis trajectory and along a non-Eigen axis path.

One or more embodiments or implementations are set forth in conjunction with the drawings, where like reference numerals refer to like elements throughout, and where the various features are not necessarily drawn to scale. Control apparatus and methods are presented for operating CMG-equipped spacecraft for transitioning from an initial state to a final state, and these concepts find utility in association with satellites, manned spacecraft, or any other form of spacecraft or vehicle.

Figure 2:
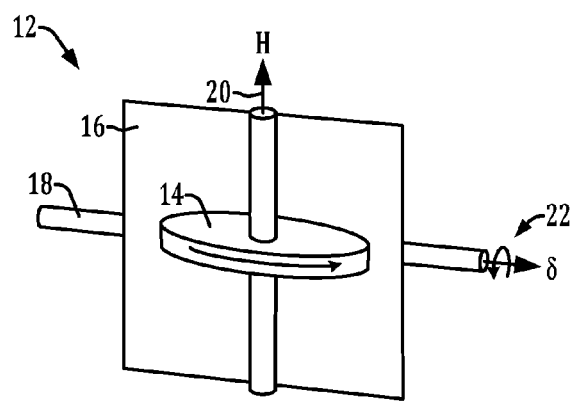
FIG. 2 is a simplified perspective view showing an exemplary control moment gyroscope (CMG) of a spacecraft that may be operated according to the techniques of the present disclosure.
Figure 3:
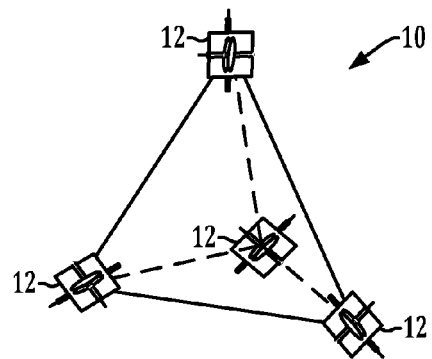
FIG. 3 illustrates positioning of four CMGs and corresponding gimbal axes for controlling a spacecraft attitude.

Referring initially to FIGS. 1-3, FIG. 1 illustrates an exemplary spacecraft 10 in a first position in which a telescope thereof is aligned to obtain images of a first reference point 2, as well as in a second position (shown in dashed lines in the figure) with the telescope facing a second reference point 4. FIG. 1 further shows an arcuate Eigen axis path 6 representing one manner of translating the spacecraft 10 from the first position to the second position, as well as a feasible non-Eigen axis path 8 (shown in dashed line) which can be achieved using the guidance-based attitude control concepts of the present disclosure. FIG. 2 illustrates an exemplary CMG 12 of the spacecraft 10, where the spacecraft 10 can have any number of CMGs 12, such as four or more having associated gimbal axes pointing in different directions in one example as shown in FIG. 3. The CMG 12 of FIG. 2 includes a rotating disk 14 as well as a rotor housing 16, with a gimbal axis 18 and a spin axis 20 about which the disk 14 rotates. In operation, the angle 22 of rotation of the CMG 12 about the gimbal axis 18 (i.e., the rotational gimbal angle $\delta$) changes orientation of the spin axis 20, and thus changes the direction of momentum vector H for a given CMG 12. The vector cross product of the gimbal angle rate ($\delta'$) and the momentum vector H provides for a torque acting orthogonal to the plane of the rotor housing 16. As seen in FIG. 3, moreover, disposition of multiple CMGs 12 at different points relative to a structure of a spacecraft 10 and manipulation of the gimbal axes 22 of the various CMGs 12 allows controlled application of torques or forces to the spacecraft 10 to provide three dimensional control of the spacecraft orientation or attitude.

Referring also to FIGS. 4-7, the spacecraft 10 is equipped with an attitude control system 30 having an attitude controller 32 providing a torque command vector 32a ($T_{com}$) to a steering law component 34, which in turn provides gimbal angle rate command signals 34a ($\delta'$) to the CMGs 12 in order to control the angular orientation of the spacecraft 10. The attitude control system 30 can be implemented using any suitable hardware and/or processor-executed software or processor-executed firmware via one or more processors and associated electronic memory, including without limitation microprocessors, microcontrollers, DSPs, programmable logic, FPGAs, etc. In certain embodiments, one or more such processing elements is programmed via computer executable instructions stored in an onboard memory of the system 30 to perform the attitude control and feasible attitude profile generation concepts disclosed herein. In this regard, the attitude controller 32 and the steering law 34 as well as other illustrated and described components of the attitude control system 30 can be implemented as processor-executed software components.

Figure 4:
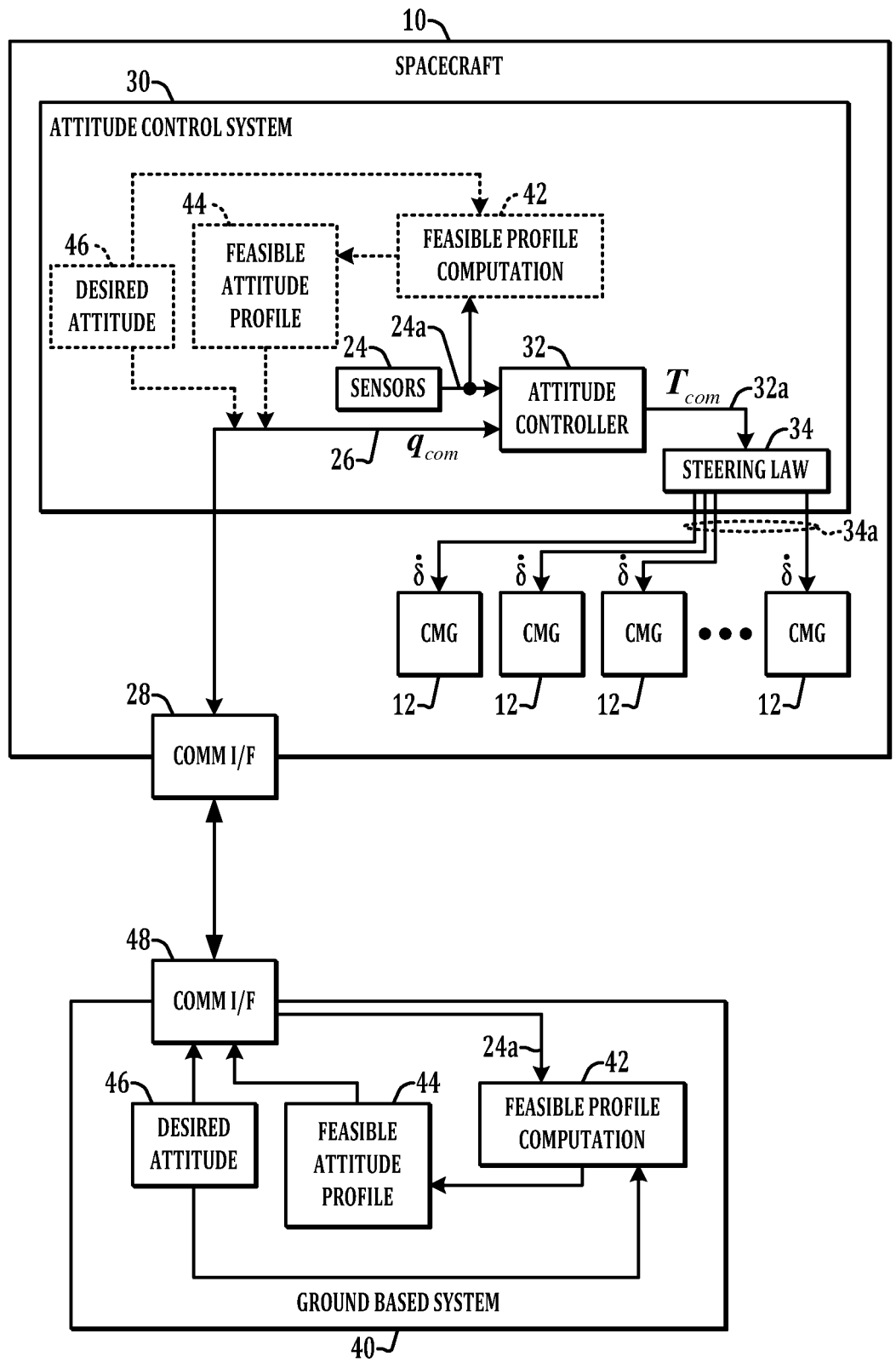
FIG. 4 is a system diagram illustrating an exemplary spacecraft with an attitude control system having an onboard feasible profile computation component in accordance with one or more aspects of the present disclosure.

As seen in FIG. 4, the spacecraft 10 also includes one or more sensors 24 providing sensor output signals or values 24a to the attitude controller 32, for example, to indicate the measured spacecraft angular positions and changes therein. For instance, the sensors 24 may be disposed at various locations on the spacecraft 10 in order to provide signals and/or values indicative of the spacecraft orientation or attitude in the form of a vector ($q=[q_1, q_2, q_3, q_4]^T$), as well as the spacecraft motion in the form of a vector ($\omega=[\omega_1, \omega_2, \omega_3]^T$), where the orientation and motion vectors q and ω each include a plurality of associated values corresponding to a number of axes in a given coordinate system. In the illustrated embodiments, for example, the attitude control system 30 operates according to a quaternion representation of orientation or attitude, which is a four-dimensional representation of the orientation angles. Likewise, the motion vector ω is also represented in one embodiment as having three values $\omega_1, \omega_2$, and $\omega_3$, although not a strict requirement of all possible implementations of the present disclosure. For example, other coordinate system representations may be used, e.g. Euler angles, which will typically be three-dimensional or of higher dimensions.

As further seen in FIG. 4, the spacecraft 10 is equipped with a communications interface 28 allowing communication with a ground based system 40 having a similar interface 48. In one possible configuration, the ground-based system 40 is a processor-based apparatus that provides a quaternion desired orientation as an input vector $q_{com}$ 26 to the attitude controller 32, with the attitude controller 32 determining an error vector representing the difference between the current spacecraft position vector 24a and the desired vector 26. The controller 32 in general operates to minimize this error by providing a torque command vector 32a to the steering law 34 for generation of the gimbal angle rate signals or values 34a provided to the CMGs 12. In this manner, an operator (or system) on the ground may provide a desired command to cause the attitude control system 30 to readjust the attitude of the spacecraft 10.

Either or both of the spacecraft 10 and the ground-based system 40 may provide apparatus for guiding the spacecraft 10 by providing a time-varying attitude command vector 44, one example being a "feasible attitude profile" in the form of a guidance command input 26 to the attitude controller 32 of the spacecraft 10. As seen in FIG. 4, the ground-based system 40 and/or the onboard attitude control system 30 may thus be provided with a feasible profile computation component 42 which generates the time-varying attitude command vector 44 based in whole or in part on a desired attitude or orientation 46. In this regard, certain implementations may involve the ground-based system 40 providing the desired attitude (e.g., a four dimensional quaternion vector) to the spacecraft 10 via the communications interfaces 48, 28, with the feasible profile computation component 42 using this and the initial spacecraft state from the sensor signals or values 24a to generate the feasible attitude profile 44 for provision to the attitude controller 32. In another possible implementation, the ground-based system 40 employs local feasible profile computation component 42 to generate the feasible attitude profile 44 based on the desired attitude vector 46 as well as on sensor output signals or values 24a received from the spacecraft 10 through the communications interfaces 28, 48 in order to compute the feasible attitude profile 44 for subsequent transmission to the spacecraft 10.

Figure 5:
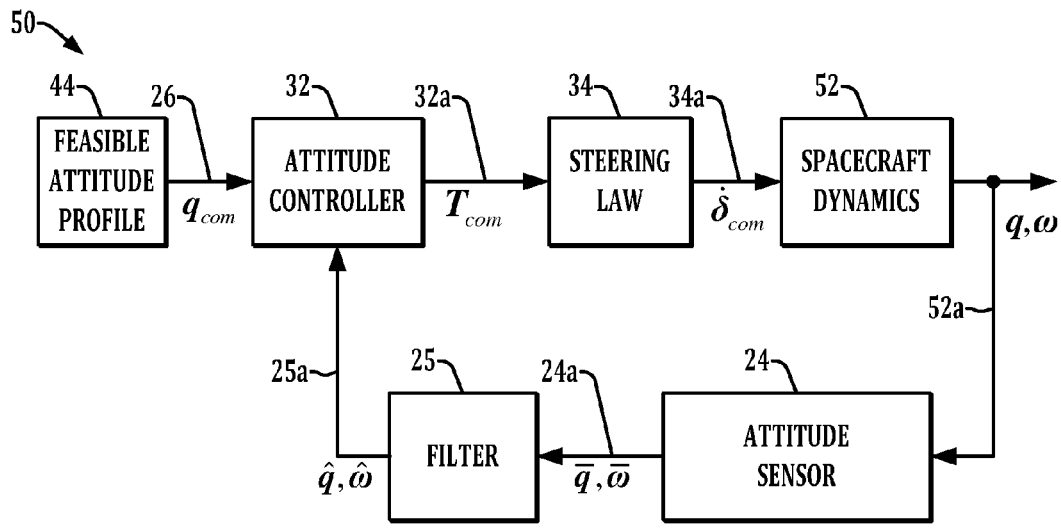
FIG. 5 is a control diagram illustrating a closed loop spacecraft attitude control system receiving an input guidance command from the feasible attitude profile component.

FIG. 5 illustrates a block diagram 50 showing operation of the attitude control system 30 in closed loop form using the time-varying attitude command vector 44 as a setpoint input 26 to the attitude controller 32. The attitude controller 32 compares the desired command vector 26 to one or more feedback vectors obtained from the attitude sensors 24 through a filter 25. In operation, the attitude controller 32 compares the current orientation of the spacecraft 10 received by way of a feedback vector 25a from the filter 25 representing a filtered output from the attitude sensor signals or values 24a, with the desired attitude 26. As seen in FIG. 5, the current spacecraft state may be in terms of angular positions "q" and/or may be represented as angular speeds "ω", or the system may operate according to angular acceleration values (not shown) or any combinations thereof. The diagram 50 of FIG. 5 includes the steering law 34 receiving the three orthogonal control torques ($T_{com}$) as a vector 32a from the attitude controller 32, with the steering law 34 determining how the orthogonal control torques can be generated by steering the CMG array 12 in a way that attempts to avoid singular states. The spacecraft dynamics 52 in FIG. 5 represent operation of the CMG array 12 as well as any other physical characteristics of the spacecraft (e.g., center of gravity, etc.), where the attitude sensors 24 sense the dynamic output 52a of the spacecraft dynamics 52 (in terms of an angle vector q, an angle rate vector ω, an angle acceleration value, etc). In the illustrated embodiment, for example, the attitude sensor 24 may be an array of sensors (not shown) operative to measure the angular rate of the spacecraft rotation and to use this information to compute the spacecraft attitude. The filter 25 advantageously operates to smooth out the raw sensor data 24a, and may be omitted in certain implementations.

Figure 6:
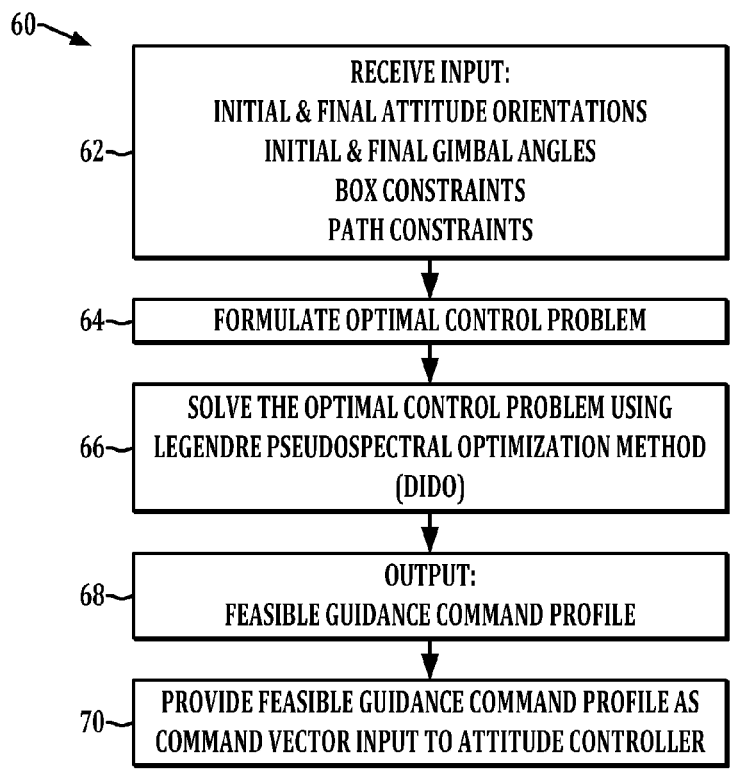
FIG. 6 is a flow diagram illustrating an exemplary method for guiding a spacecraft in accordance with further aspects of the disclosure.

FIG. 6 illustrates an exemplary process or method 60 for guiding a spacecraft 10 from an initial state to a final state (e.g., from the initial state facing a reference point 2 to a final state facing a reference point 4 in FIG. 1 above) using an array of CMGs 12. The illustrated process 60, in practice, may be advantageously employed to mitigate or avoid CMG singularity problems, even in the presence of loss of one or more CMGs 12, thereby providing contingency operation. This is a significant advance over conventional techniques which employ modification of a steering law on board the spacecraft 10 in order to implement non-Eigen axis operation and/or null-motion steering, neither of which can provide an adequate solution in the presence of a failed CMG 12. Although the illustrated process 60 and other methods of the present disclosure are depicted and described in the form of a series of acts or events, it will be appreciated that the various methods of the disclosure are not limited by the illustrated ordering of such acts or events except as specifically set forth herein. Except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, or combinations thereof, in order to provide spacecraft guidance functions as described herein, and various embodiments or implementations include non-transitory computer readable mediums having computer-executable instructions for performing the illustrated and described methods. For instance, the method 60 may be performed in the attitude control system 30 of the spacecraft 10 and/or via a processor of the ground-based system 40 to implement the feasible profile computation concepts disclosed herein.

Figure 7:
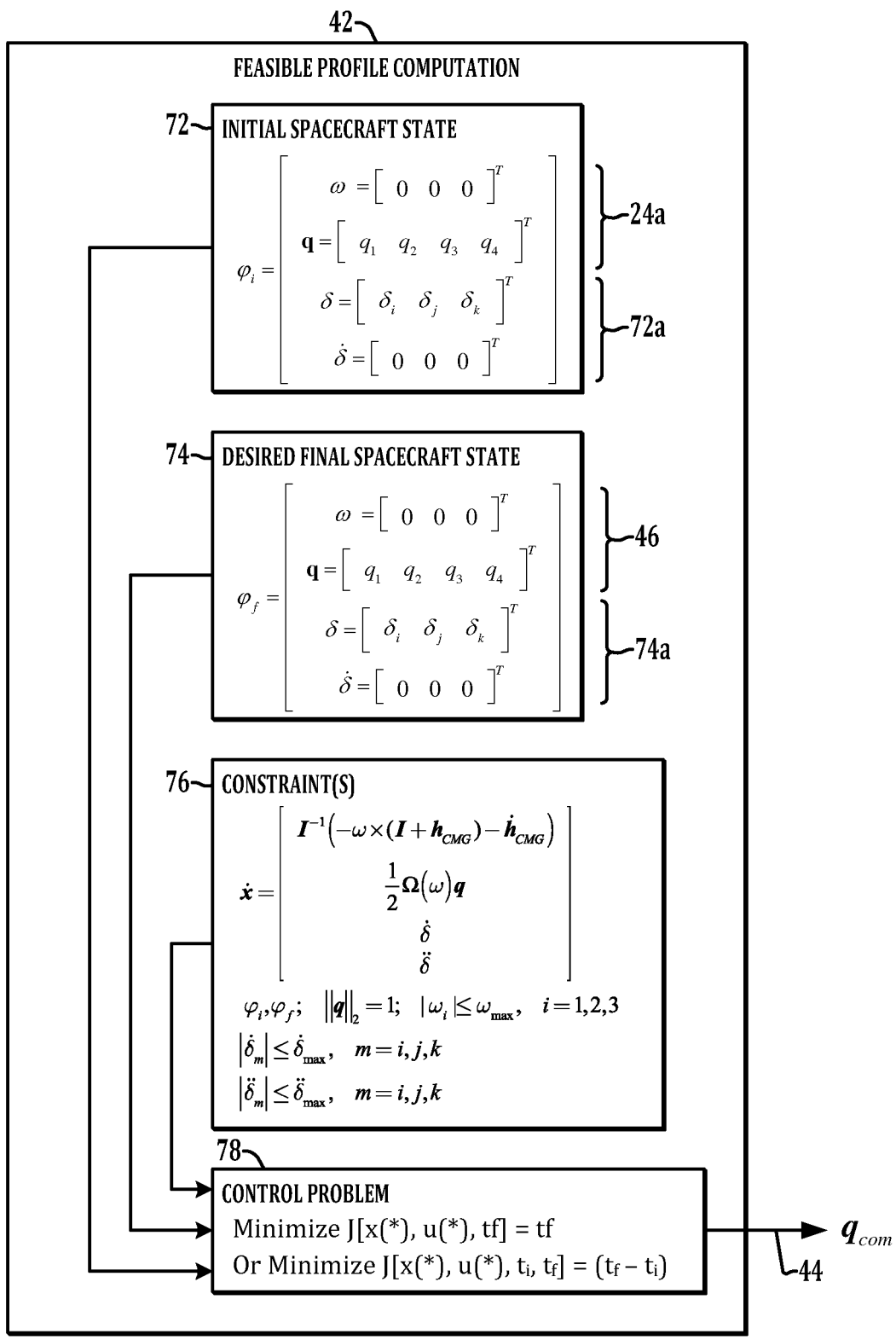
FIG. 7 is a schematic diagram illustrating further details of the feasible profile computation component.

Referring now to FIGS. 6 and 7, method 60 begins at 62 in FIG. 6, with the feasible profile computation component 42 receiving an initial spacecraft state 72 ($\phi_i$), which may be derived in whole or in part, directly and/or indirectly (e.g., through the filter 25 in FIG. 5) from the attitude sensor output signals or values 24a, which may also include feedback from the array of CMGs 12. In particular, the initial spacecraft state 72 in FIG. 7 includes an initial spacecraft attitude vector 24a ($q=[q_1, q_2, q_3, q_4]^T$), an initial spacecraft motion vector 24a ($\omega=[\omega_1, \omega_2, \omega_3]^T$), an initial CMG angle vector 72a ($\delta=[\delta_i, \delta_j, \delta_k]^T$) and an initial CMG angle rate vector 72a ($\delta'=[\delta'_i, \delta'_j, \delta'_k]^T$). The profile computation component 42, moreover, receives a desired final spacecraft state 74 ($\phi_f$) at 62 in FIG. 6, which defines the desired final spacecraft attitude vector 46 ($q=[q_1, q_2, q_3, q_4]^T$), a desired final spacecraft motion vector 46 ($\omega=[\omega_1, \omega_2, \omega_3]^T$), a desired final CMG angle vector 74a ($\delta=[\delta_i, \delta_j, \delta_k]^T$) and a desired final CMG angle rate vector 74a ($\delta'=[\delta'_i, \delta'_j, \delta'_k]^T$). As mentioned above, the desired final spacecraft state 74 may be provided, in whole or in part, directly and/or indirectly, from the ground-based system 40 (e.g., desired attitude 46 in FIG. 4 above) and/or the final state 74 may be generated on board the spacecraft 10. In the illustrated implementation, the attitude vector is four dimensional due to the preferred use of a quaternion attitude representation, and the motion and CMG vectors 72a and 74a are each three-dimensional vectors, although the various concepts of present disclosure are not limited to the specific examples, and the initial and desired final states 72 and 74 may be defined and/or represented in terms of vectors of different (e.g., higher and/or lower) orders than the illustrated implementations. The inputs thus define the desired spacecraft attitude orientations as well as the spacecraft angular rates at the beginning and end of the maneuver, and may also include initial and final CMG states in certain implementations, e.g., gimbal angles, gimbal rates and/or gimbal accelerations. Any number of different inputs can be provided allowing configuration for various different contingency maneuvers, without modifying the onboard steering law used by the attitude control system 30.

The feasible profile computation component 42, moreover, receives one or more constraints 76 at 62, which may include one or both of box constraints and path constraints. In various embodiments, the component 42 receives at least one constraint 76 that defines desired limitations with respect to spacecraft attitude, spacecraft motion, and/or CMG operation. For example, as seen in FIG. 7, the computation component 42 utilizes dynamical constraints regarding the time derivative of the spacecraft state vector (x'). A typical embodiment of the spacecraft dynamics, that would be familiar to one of ordinary skill in the art, includes an equation describing the spacecraft acceleration that is affected by the spacecraft inertia (I), and vectors representing angle rate $\omega$, CMG momentum ($h_{CMG}$) and the time derivative thereof ($h'_{CMG}$). In addition, the evolution of the spacecraft state vector (x) can be characterized in terms of kinematic differential equations comprising a skew symmetric matrix $\Omega$ whose elements are a function of the angle rate $\omega$ and the quaternion q, and further with respect to the first and second time derivatives of the gimbal angle $\delta$. The constraints 76, in this regard, may be dynamically adjusted as needed by any process operator, at the spacecraft 10 and/or by the ground-based system 40, or the constraints may be updated with each usage of the feasible profile computation component 42. As seen in FIG. 7, moreover, certain embodiments provide at least one path constraint limiting the norm of the spacecraft attitude vector ($q=[q_1, q_2, q_3, q_4]^T$), and/or one or more box constraints defining a limit ($\omega_{max}$) on an absolute value of spacecraft angle rates ($\omega_i$) of the spacecraft motion vector 46 ($\omega=[\omega_1, \omega_2, \omega_3]^T$), and/or one or more box constraints on the spacecraft acceleration or higher motion derivatives, and/or a box constraint defining a limit $\delta'_{max}$ on an absolute value of gimbal rates $\delta'_m$ of the CMG angle rate vector 74a ($\delta'=[\delta'_i, \delta'_j, \delta'_k]^T$) and/or a box constraint defining a limit $\delta''_{max}$ on an absolute value of gimbal accelerations $\delta'''_m$.

The received input data 72, 74, 76 thus describes the spacecraft state at the beginning of the maneuver as well as the spacecraft state at the end of the maneuver, in addition to constraints that must be satisfied during the maneuver. In one possible implementation, a set of inputs can be provided at 62 in a vector form including the spacecraft state 72 at the beginning of one possible reorientation maneuver (FIG. 7). In this example, the spacecraft 10 starts from rest, i.e. with the spacecraft angular rates or speed set to zero ($\omega=[0\ 0\ 0]^T$), and with the attitude described by the quaternion vector $q=[q_1\ q_2\ q_3\ q_4]^T$. In this implementation, moreover, the initial configuration of the CMG array 12 is specified by vectors $\delta=[\delta_i\ \delta_j\ \delta_k]^T$ and $\dot{\delta}=[0\ 0\ 0]^T$, in which the indices i, j and k are used to specify the particular CMGs 12 from an array of n≥3 that are not in the failed state. In addition, the desired final state 74 describes the desired state of the spacecraft 10 at the end of the contingency maneuver. A feasible guidance command profile 44 is obtained for each contingency maneuver that is to be performed in the satellite failure state as the solution to the optimal control problem 78 in this example. In the illustrated embodiment, the objective function "J[x(*), u(*), $t_f$]=$t_f$", also referred to as the cost function, is the overall maneuver time, and the model of the spacecraft dynamics (x') is given by standard equations, well known to those of ordinary skill in the art. The spacecraft attitude is described using quaternions, and the dynamics of the CMG gimbals 12 in this example are described using a simple double integrator model. In other embodiments of the present invention, alternative models of the dynamics of the CMG gimbals could be utilized. The system states in this case are satellite angular rates, the quaternions, the CMG gimbal angles, and the CMG rates, and the control variables are CMG gimbal accelerations. In the illustrated implementation, a path constraint on the norm of the quaternion vector is specified, and box constraints are imposed on the allowable CMG gimbal rates and on the allowable CMG gimbal angles. Path constraints on the satellite angular rates can also be specified as shown at 76 in FIG. 7 and/or path constraints on the satellite angular accelerations (not shown in FIG. 7) can also be specified.

At 64 in FIG. 6, the feasible profile computation component 42 formulates a control problem (e.g., an optimal control problem 78 as shown in FIG. 7) at least partially according to the input data 72, 74, 76. In the illustrated embodiment, for example, the component 42 constructs an objective function or cost function 78 that includes a spacecraft system state defined by the spacecraft attitude vector ($q=[q_1, q_2, q_3, q_4]^T$), the spacecraft motion vector ($\omega=[\omega_1, \omega_2, \omega_3]^T$), the CMG angle vector ($\delta=[\delta_i, \delta_j, \delta_k]^T$), and the CMG angle rate vector ($\delta'=[\delta'_i, \delta'_j, \delta'_k]^T$), as well as a control variable vector u(*) representing CMG gimbal accelerations. In this example, moreover, the objective function is constructed in terms of overall maneuver time ($t_f$-$t_i$). Different embodiments are possible with the computation component 42 formulating any suitable type of control problem 78 for which a solution provides time-varying signals or values (e.g., time-histories) of the spacecraft attitude and other internal states, including without limitation, spacecraft angular velocities, gimbal angles, gimbal rates, gimbal accelerations, etc. In this regard, the time-varying attitude command signals or values provided as part of the feasible attitude profile 44 in certain embodiments correspond to a spacecraft maneuver that enables the specifications on the initial and final spacecraft states and CMG configuration to be met within a predetermined tolerance. The optimal control problem 78 in this example, moreover, is solved to minimize or maximize a mathematical objective function related to some aspect of the spacecraft performance, such as minimizing the overall maneuver time ($t_f$-$t_i$) (e.g., Minimize J[x(*), u(*), ti, tf]=(tf−ti)). In some contingency operation scenarios, an objective function 78 can be solved advantageously with respect to terms that facilitate minimizing energy consumption. Moreover, an objective function to be optimized need not be specified in all embodiments, and other implementations are contemplated in which a solution to an optimal control problem formulation may be used that enables the specifications on the initial and final spacecraft states and CMG array configuration to be satisfied without regard to a particular objective function. Moreover, the illustrated optimal control problem formulation 78 also provides a mathematical specification of the nominal and/or failed spacecraft dynamics, which can be a model having any arbitrary fidelity as selected by an operator or other user. The use of the dynamics model in certain embodiments helps to ensure that the solved maneuver trajectory, i.e. the solution to the control problem, will cause the spacecraft to successfully perform the maneuver with respect to the governing physics. Conventional maneuvers, on the other hand, are based on the attitude kinematics only and therefore may not be physically implementable upon the spacecraft unless the motion variables are selected to be conservative. As seen in FIG. 7, moreover, the optimal control problem formulation 78 can additionally include mathematical specifications that constrain the operation of the spacecraft to predefined bounds, such as an inequality that constrains the spacecraft angular rate to be below a certain value, or other constraints with respect to CMG gimbal angles, gimbal rates, and/or gimbal accelerations can also be defined as part of the optimal control problem formulation at 64.

The control problem 78 is then solved at 66 in FIG. 6 in order to provide the feasible time-varying attitude command vector 44 ($q_{com}$=$[q_1, q_2, q_3, q_4]^T$) which includes a plurality of time-varying attitude command signals or values 26 representing a plurality of spacecraft states and control trajectories with respect to spacecraft angles q, spacecraft angle rates ω and/or spacecraft angle accelerations. In the illustrated implementation, moreover, the control problem 78 is solved at 66 by minimizing the overall maneuver time ($t_f$-$t_i$). In one possible implementation, the control problem 78 can be solved via the Legendre Pseudospectral optimal control technique, although other embodiments could also be applied to perform the control problem solution at 66, including without limitation shooting, multiple shooting or collocation. As a result of the optimal control problem solution at 66, the time-varying attitude command signals or values 26 are provided, for example, as a set of state and control trajectories that describe the time-evolution of the spacecraft attitude and other internal states over the time interval between the beginning and end of the maneuver (e.g., between $t_i$ and $t_f$). In one possible implementation, only the attitude profile 44 may be used as the guidance command 26, but time-derivatives of the attitude profile 44 could also be used to drive the attitude controller in other possible alternative embodiments.

At 70 in FIG. 6, the time-varying attitude command vector 44 is provided as a guidance command input 26 to an attitude controller 32 of the spacecraft 10. As previously noted, this is a significant difference from conventional attitude control techniques in which the steering law 34 is modified to accommodate failure conditions. The present disclosure, in contrast, modifies the guidance input to the closed loop attitude control scheme (e.g., FIG. 5) and thus facilitates incorporation of the disclosed techniques into pre-existing spacecraft 10 to prevent CMG singularities and accommodate failure conditions without otherwise modifying the attitude control system 30. For example, one possible implementation provides the feasible profile computation component 42 at a ground based system 40 (e.g., FIG. 4 above), with the ground-based system 40 providing the feasible attitude profile 44 via the communications interfaces 48 and 28 without any further modification to the spacecraft 10. In addition, as discussed above, the disclosed process 60 and apparatus advantageously operate in the presence of one or more CMG failures, and provide contingency control capabilities beyond those of conventional approaches involving steering law modification.

The present disclosure thus facilitates avoidance and/or mitigation of CMG singularity and contingency operations of a failed CMG-actuated spacecraft 10 by providing attitude command targets including time-varying signals that can be tracked by a standard attitude control architecture, wherein singularity conditions are advantageously avoided or mitigated and contingency operations are facilitated from a guidance point of view. The attitude controller of FIGS. 4 and 5 compares the current measured spacecraft orientation to the time-varying attitude command vector $q_{com}$. Feasible attitude profiles 44 are used as an input to any conventional attitude controller 32 in order to generate a vector of time-varying control torque signals that are subsequently processed by the steering law 34 to reorient the spacecraft 10 between any arbitrary initial attitude to any arbitrary final attitude. The output of the steering law 34 accordingly provides a vector of time varying gimbal rate commands 34a that are used to drive the individual CMG gimbals. In other possible nonlimiting implementations, the output of the steering law 34 could be a vector of gimbal angles or gimbal accelerations, depending on the control architecture that is implemented as part of the spacecraft attitude control system 30. The resulting motion of the CMG gimbals 12 causes a torque to be applied to the spacecraft body 10 that, in turn, enables the spacecraft 10 to be rotated.

Figure 8:
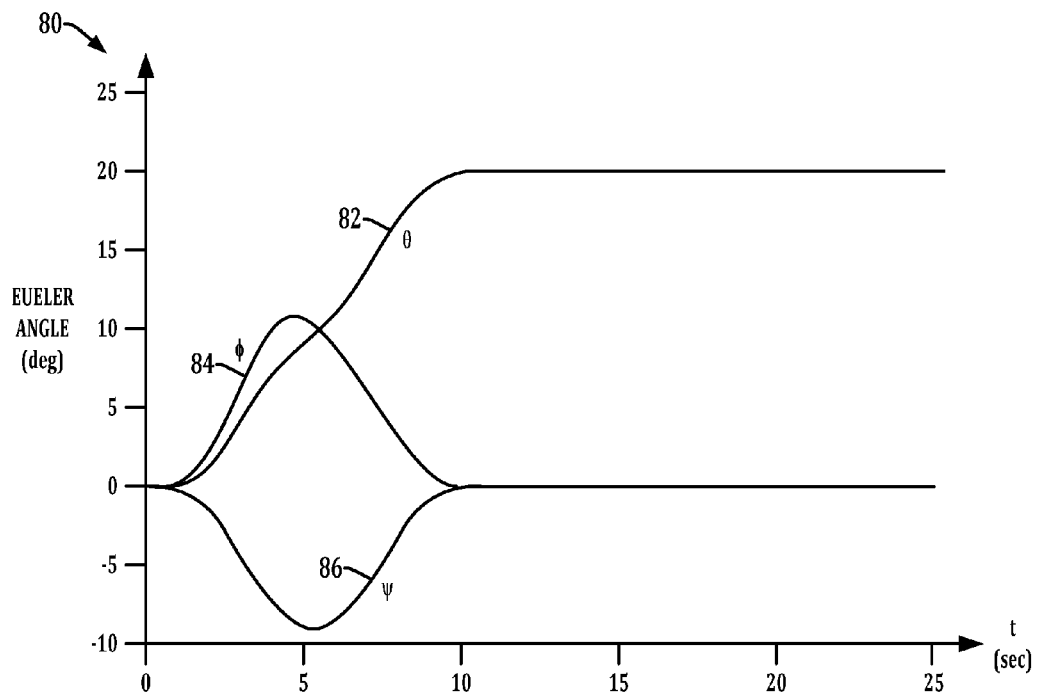
FIG. 8 is a graph illustrating Euler angles as a function of time for an exemplary non-Eigen axis command profile in accordance with the present disclosure.
Figure 9:
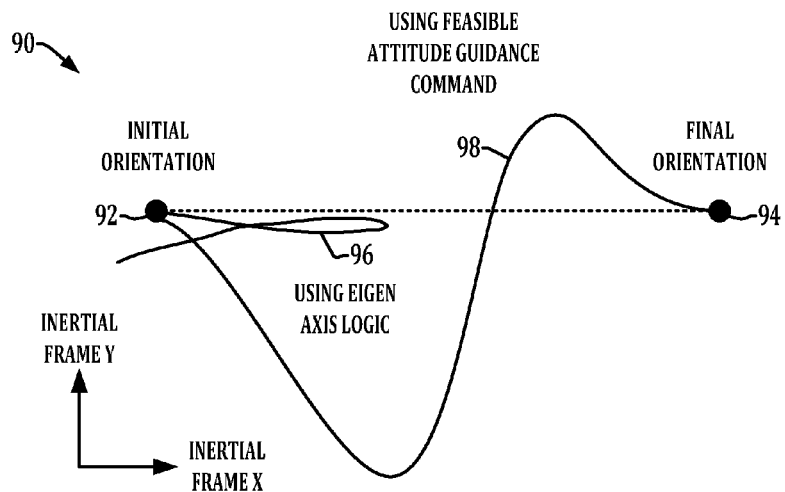
FIG. 9 is a graph showing a successful contingency maneuver for a failed CMG spacecraft using the feasible guidance profile, as well as an unsuccessful attempt at Eigen axis maneuver for the failed CMG spacecraft.

Referring also to FIGS. 8 and 9, the graph 80 in FIG. 8 illustrates Euler angles 82 (θ), 84 (φ) and 86 (ψ) for a typical contingency maneuver for a failed spacecraft 10 with n=3 active CMGs 12. The illustrated example is for a commanded rotation of 20-degrees about the pitch-axis of a typical spacecraft 10, in which the maneuver specifications dictate that the spacecraft 10 is initially at rest with zero angular rates, with the spacecraft 10 being brought to rest again in the desired final attitude. In addition, the CMG array 12 in this example is initially configured such that δ=$[0\ 60\ -60]^T$-degrees.

A feasible guidance profile 44 for the non-Eigen axis contingency maneuver is shown in FIG. 8. As seen, use of the feasible guidance profile 44 generated by the method 60 via an otherwise conventional spacecraft attitude control system enables the contingency maneuver using a spacecraft 10 with only three active CMGs 12. As seen in the graph 90 of FIG. 9, moreover, for the same maneuver to transition from an initial orientation 92 to a final desired orientation 94, use of a conventional Eigen axis control approach 96 results in a failure of the attempted reorientation because the spacecraft 10 does not reach the prescribed final orientation 94. In this regard, alignment of the torque command vectors with the singular vectors prevents angular momentum from being exchanged between the failed CMG array 12 and the spacecraft 10. Use of the feasible attitude guidance command 44, on the other hand, results in the maneuver curve 98 shown in FIG. 9, which successfully reaches the final orientation 94. It is noted in the curves 84 and 86 of FIG. 8, moreover, that the non-Eigen axis maneuver provided through use of the time-varying attitude command vector 44, 26 does not yield a true Eigen axis maneuver, since the curves 84 and 86 are nonzero. By using the feasible guidance profile 44, non-Eigen axis motion can be provided to generate a control torque in a plane normal to the singular vector, and thus the desired spacecraft attitude can be controlled even with a failed CMG array 12 by exchanging angular momentum in a plane normal to the CMG singular vector.

It will be understood that many additional changes in the details, materials, procedures and arrangement of parts, which have been herein described and illustrated to explain the nature of the invention, may be made by those skilled in the art within the principal and scope of the invention as expressed in the appended claims.

The following is claimed:

1. A method for guiding a spacecraft from an initial state to a final state using a plurality of control momentum gyroscopes (CMGs), the method comprising:
   receiving input data including:
      an initial spacecraft state defining an initial spacecraft attitude vector, an initial spacecraft motion vector, an initial CMG angle vector, and an initial CMG angle rate vector,
      a desired final spacecraft state defining a desired final spacecraft attitude vector, a desired final spacecraft motion vector, a desired final CMG angle vector, and a desired final CMG angle rate vector, and
      at least one constraint defining one or more desired limitations with respect to at least one of spacecraft attitude, spacecraft motion, and CMG operation;
   formulating a control problem based at least partially on the input data;
   solving the control problem to provide a feasible time-varying attitude command vector comprising a plurality of time-varying attitude command signals or values representing a plurality of spacecraft states and control trajectories with respect to one of spacecraft angles, spacecraft angle rates, and spacecraft angle accelerations; and
   providing the feasible time-varying attitude command vector as a guidance command input to an attitude controller of the spacecraft.

2. The method of claim 1:
   wherein formulating the control problem comprises constructing an objective function or cost function including:
      a spacecraft system state defined by a spacecraft attitude vector, a spacecraft motion vector, a CMG angle vector, and a CMG angle rate vector, and
      a control variable vector representing CMG gimbal accelerations.

3. The method of claim 2, wherein formulating the control problem comprises constructing an objective function or cost function in terms of overall maneuver time, and wherein solving the control problem comprises minimizing the overall maneuver time.

4. The method of claim 3, wherein formulating the control problem comprises providing a model of spacecraft dynamics with arbitrary fidelity.

5. The method of claim 4, wherein the at least one constraint includes at least one box constraint defining a limit on an absolute value of spacecraft angle rates of the spacecraft motion vector.

6. The method of claim 5, wherein the at least one constraint includes at least one of a box constraint defining a limit on an absolute value of gimbal rates of the CMG angle rate vector and a box constraint defining a limit on an absolute value of gimbal accelerations.

7. The method of claim 2, wherein formulating the control problem comprises providing a model of spacecraft dynamics with arbitrary fidelity.

8. The method of claim 2, wherein the at least one constraint includes at least one box constraint defining a limit on an absolute value of spacecraft angle rates of the spacecraft motion vector.

9. The method of claim 2, wherein the at least one constraint includes at least one of a box constraint defining a limit on an absolute value of gimbal rates of the CMG angle rate vector and a box constraint defining a limit on an absolute value of gimbal accelerations.

10. The method of claim 1, wherein the at least one constraint includes at least one path constraint defining a maximum limit on a norm of the spacecraft attitude vector.

11. The method of claim 1, wherein formulating the control problem comprises providing a model of spacecraft dynamics with arbitrary fidelity.

12. The method of claim 1, wherein the at least one constraint includes at least one box constraint defining a limit on an absolute value of spacecraft angle rates of the spacecraft motion vector.

13. The method of claim 1, wherein the at least one constraint includes at least one of a box constraint defining a limit on an absolute value of gimbal rates of the CMG angle rate vector and a box constraint defining a limit on an absolute value of gimbal accelerations.

14. A non-transitory computer readable medium with computer executable instructions for guiding a spacecraft from an initial state to a final state using a plurality of control momentum gyroscopes (CMGs), the computer readable medium having computer executable instructions for:
   receiving input data including:
      an initial spacecraft state defining an initial spacecraft attitude vector, an initial spacecraft motion vector, an initial CMG angle vector, and an initial CMG angle rate vector,
      a desired final spacecraft state defining a desired final spacecraft attitude vector, a desired final spacecraft motion vector, a desired final CMG angle vector, and a desired final CMG angle rate vector, and
      at least one constraint defining one or more desired limitations with respect to at least one of spacecraft attitude, spacecraft motion, and CMG operation;
   formulating a control problem based at least partially on the input data;
   solving the control problem to provide a feasible time-varying attitude command vector comprising a plurality of time-varying attitude command signals or values representing a plurality of spacecraft states and control trajectories with respect to one of spacecraft angles, spacecraft angle rates, and spacecraft angle accelerations; and
   providing the feasible time-varying attitude command vector as a guidance command input to an attitude controller of the spacecraft.

15. A spacecraft guidance system, comprising:
   at least one processor programmed to:
      receive input data including:
         an initial spacecraft state defining an initial spacecraft attitude vector, an initial spacecraft motion vector, an initial CMG angle vector, and an initial CMG angle rate vector, a desired final spacecraft state defining a desired final spacecraft attitude vector, a desired final spacecraft motion vector, a desired final CMG angle vector, and a desired final CMG angle rate vector, and at least one constraint defining one or more desired limitations with respect to at least one of spacecraft attitude, spacecraft motion, and CMG operation;

formulate a control problem based at least partially on the input data;

solve the control problem to provide a feasible time-varying attitude command vector comprising a plurality of time-varying attitude command signals or values representing a plurality of spacecraft states and control trajectories with respect to one of spacecraft angles, spacecraft angle rates, and spacecraft angle accelerations; and provide the feasible time-varying attitude command vector as a guidance command input to an attitude controller of the spacecraft.

16. The spacecraft guidance system of claim 15, wherein the at least one processor is programmed to formulate the control problem with an objective function or cost function including:

a spacecraft system state defined by a spacecraft attitude vector, a spacecraft motion vector, a CMG angle vector, and a CMG angle rate vector, and a control variable vector representing CMG gimbal accelerations.

17. The spacecraft guidance system of claim 16, wherein the at least one processor is programmed to formulate the control problem with an objective function or cost function in terms of overall maneuver time, and to solve the control problem by minimizing the overall maneuver time.

18. The spacecraft guidance system of claim 15, wherein the control problem comprises a model of spacecraft dynamics with arbitrary fidelity.

19. The spacecraft guidance system of claim 15, wherein the at least one constraint includes at least one box constraint defining a limit on an absolute value of spacecraft angle rates of the spacecraft motion vector.

20. The spacecraft guidance system of claim 15, wherein the at least one constraint includes at least one of a box constraint defining a limit on an absolute value of gimbal rates of the CMG angle rate vector and a box constraint defining a limit on an absolute value of gimbal accelerations.

* * * * *